US008656819B2

(12) United States Patent
Finnell

(10) Patent No.: US 8,656,819 B2
(45) Date of Patent: Feb. 25, 2014

(54) RIGID FOAM INSULATION CUTTING SYSTEM AND METHOD OF USE

(76) Inventor: Jefferson W. Finnell, Vernon, VT (US)

( * ) Notice: Subject to any disclaimer, the term of this patent is extended or adjusted under 35 U.S.C. 154(b) by 374 days.

(21) Appl. No.: 12/803,878

(22) Filed: Jul. 8, 2010

(65) Prior Publication Data

US 2011/0036219 A1 Feb. 17, 2011

Related U.S. Application Data

(60) Provisional application No. 61/274,174, filed on Aug. 11, 2009.

(51) Int. Cl.
*B23D 47/02* (2006.01)

(52) U.S. Cl.
USPC ........... 83/872; 83/425.4; 83/471; 83/522.11; 83/821; 83/859; 144/286.1

(58) Field of Classification Search
USPC ............. 83/13, 870, 872, 873, 284, 425, 407, 83/408, 425.2–425.4, 428, 433, 746, 469, 83/471, 472, 483, 485, 486, 522.11, 83/522.13, 522.15, 522.16, 522.18, 83/522.19, 613, 821, 662, 859; 144/286.1, 144/286.5, 287
See application file for complete search history.

(56) References Cited

U.S. PATENT DOCUMENTS

| | | | | |
|---|---|---|---|---|
| 1,434,475 | A * | 11/1922 | Austin | 83/455 |
| 3,092,154 | A * | 6/1963 | Dobslaw | 83/486.1 |
| 3,242,779 | A | 3/1966 | Mona | |
| 3,786,701 | A | 1/1974 | Ludwig | |
| 3,848,327 | A * | 11/1974 | Gerber et al. | 29/559 |
| 3,942,411 | A * | 3/1976 | Gerber | 409/137 |
| 4,528,878 | A * | 7/1985 | Gerber | 83/56 |
| 4,635,515 | A * | 1/1987 | Altman | 83/438 |
| 5,482,026 | A * | 1/1996 | Russell | 125/12 |
| 7,387,120 | B2 * | 6/2008 | O'Banion et al. | 125/23.02 |
| 7,555,976 | B2 * | 7/2009 | Logan et al. | 83/471 |

* cited by examiner

*Primary Examiner* — Phong Nguyen
(74) *Attorney, Agent, or Firm* — Clifford F. Rey

(57) ABSTRACT

A cutting system and method of use for manually cutting rigid foam insulation panels; the present cutting system is operated manually and requires no electric power whatsoever; the cutting system includes a fully adjustable carriage assembly whereon a cutting blade is mounted for traversing the limits of its working surface; the cutting system provides a measuring scale having graduated indicia inscribed thereon for conveniently changing blade settings to accommodate different foam panel dimensions; the cutting system produces a uniformly accurate cut surface comparable to a factory-made surface without damaging the foil moisture barrier on the rigid foam panel; the cutting system completely eliminates the health and safety hazards created by airborne foam particulates that are produced by powered cutting of such rigid foam materials and thereby provides an environmentally-friendly building practice; and the present cutting system is completely portable enabling its setup and use at any construction site or location.

5 Claims, 5 Drawing Sheets

RIGID FOAM INSULATION CUTTING SYSTEM AND METHOD OF USE

CROSS-REFERENCE TO RELATED APPLICATIONS

This patent application claims the benefit under 35 U.S.C. 119(e) of U.S. Provisional Patent Application No. 61/274,174 filed Aug. 11, 2009, entitled Rigid Foam Insulation Cutting System and Method of Use.

BACKGROUND OF INVENTION

1. Field of Invention

The present invention relates to rigid foam insulation panels and, more particularly, to a method and apparatus for cutting such rigid foam insulation panels.

Rigid foam insulation panels are widely used in the building trade to provide an additional layer of insulation in the construction of new homes and commercial buildings. Typically, such rigid foam panels are used as a replacement for fiberglass batting and are cut to fit between wall studs. Sheets of rigid foam are also installed on the sides of houses being constructed, remodeled or repaired to provide additional insulation to the exterior walls. Such foam panels provide good thermal resistance and often add structural strength to the building. Since such rigid foam insulation panels are well known to those skilled in the art further detailed discussion of the same is not deemed necessary.

A problem is encountered in cutting rigid foam insulation panels on the construction site. Such foam panels are typically provided in four-by-eight foot sheets and are often cut manually by the use of a utility knife and a straight edge. Using this method the foam panel is partially cut to a limited depth at the desired dimension and, thereafter, manually snapped along the superficial cut. However, this technique produces an uneven cut surface and quickly dulls the utility knife blade after repeated use resulting in damage to the foil moisture barrier which is typically adhered to the surface of the foam panel.

Alternatively, circular saw or a table saw powered by an electric motor is utilized to cut the rigid foam panels, but this technique produces a substantial amount of airborne foam insulation particulates, which pose a health hazard to the user or to anyone in the vicinity.

2. Background Art

There are prior art patents that are available in the field of the present invention and their discussion follows. One method for cutting rigid foam panels employed in the past has involved the use of electrically heated wires which are drawn through the foam material to cause severing of the cellular material. For example, U.S. Pat. No. 3,786,701 discloses a Device for Cutting Urethane Foam comprising a carriage adapted to advance a slab of urethane material through a cutter assembly including groups of elongated cutting wires which are heated and oscillated longitudinally to clean the wires as the material is advanced through the device. However, the melted foam material inevitably builds up on the hot cutting wires preventing a satisfactory cut of the foam material. The oscillatory drive mechanism is powered by a conventional drive transmission means such as a belt and pulley arrangement connected to a drive motor, which has all the electromechanical complexities of such a powered system and the related maintenance problems as well.

Another method of producing boards of cellular material involves the use of blade cutting equipment. For example, U.S. Pat. No. 3,242,779 discloses a Reciprocal Saw for Cellular Resinous Bodies which is a multiple blade machine capable of sawing a foam block into a plurality of boards during a single pass of the machine. Generally, such a reciprocal saw apparatus involves a number of problems including the ability to change blades and blade settings readily and the maintenance of a conventional motor and drive mechanism.

Thus, the present invention has been developed to resolve these problems and other shortcomings of the prior art.

SUMMARY OF THE INVENTION

Accordingly, the present invention provides a cutting system and method of use for manually cutting rigid foam insulation panels. The present cutting system requires no electric power, which completely eliminates airborne foam particulates produced by powered cutting, and permits the use thereof at any location or construction site. Advantageously, the present cutting system includes a cutting blade that produces a uniformly accurate, cut surface without damaging the foil moisture barrier on the foam insulation panel. In addition, the present cutting system is fully adjustable to accommodate four by eight foot sheets of rigid foam insulation of different thicknesses (i.e. up to two inches) in a single pass of the cutting blade.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the concept upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
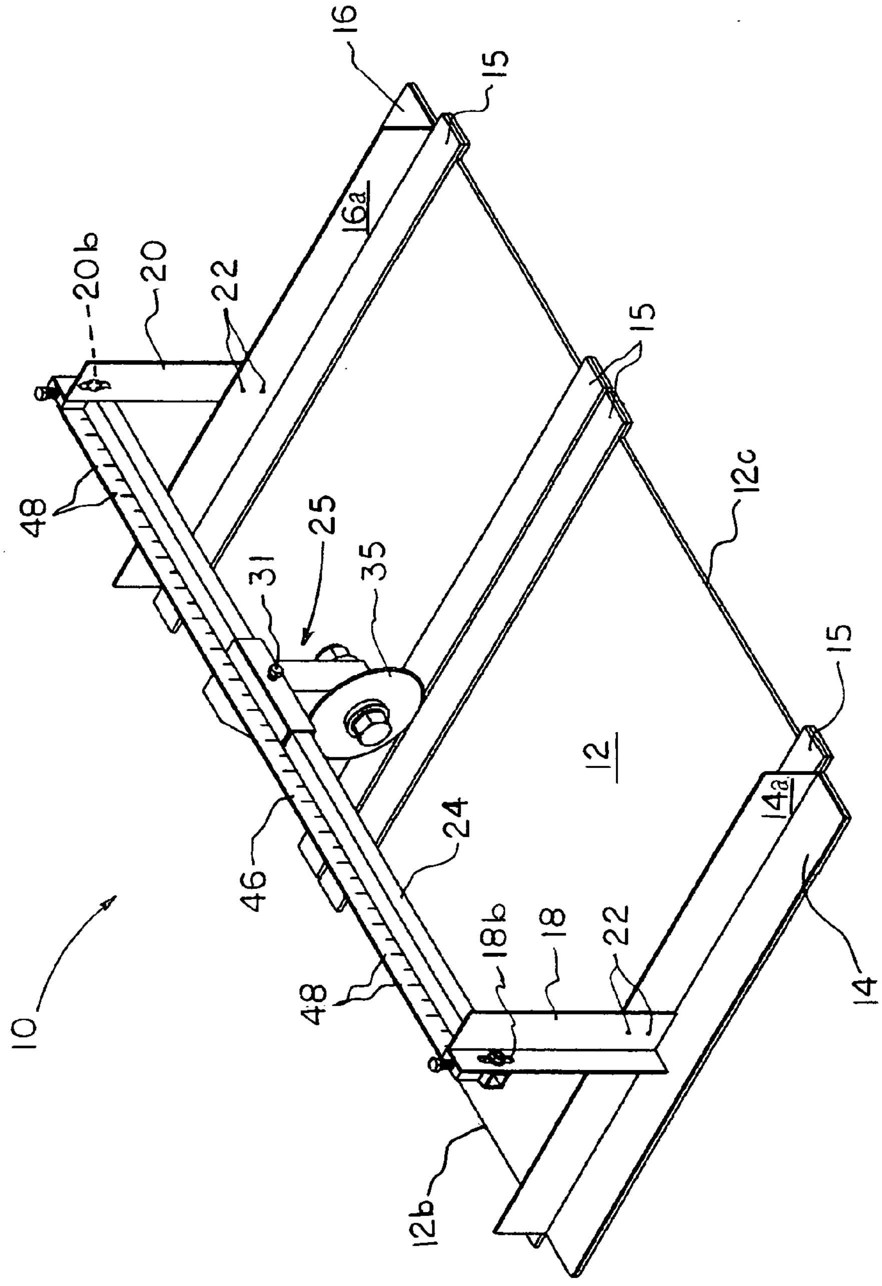
FIG. 1 is a front perspective view of the present rigid foam insulation cutting system.

With further reference to the drawings there is shown therein a rigid foam insulation cutting system in accordance with the present invention, indicated generally at 10 and illustrated in FIG. 1.

Figure 5:
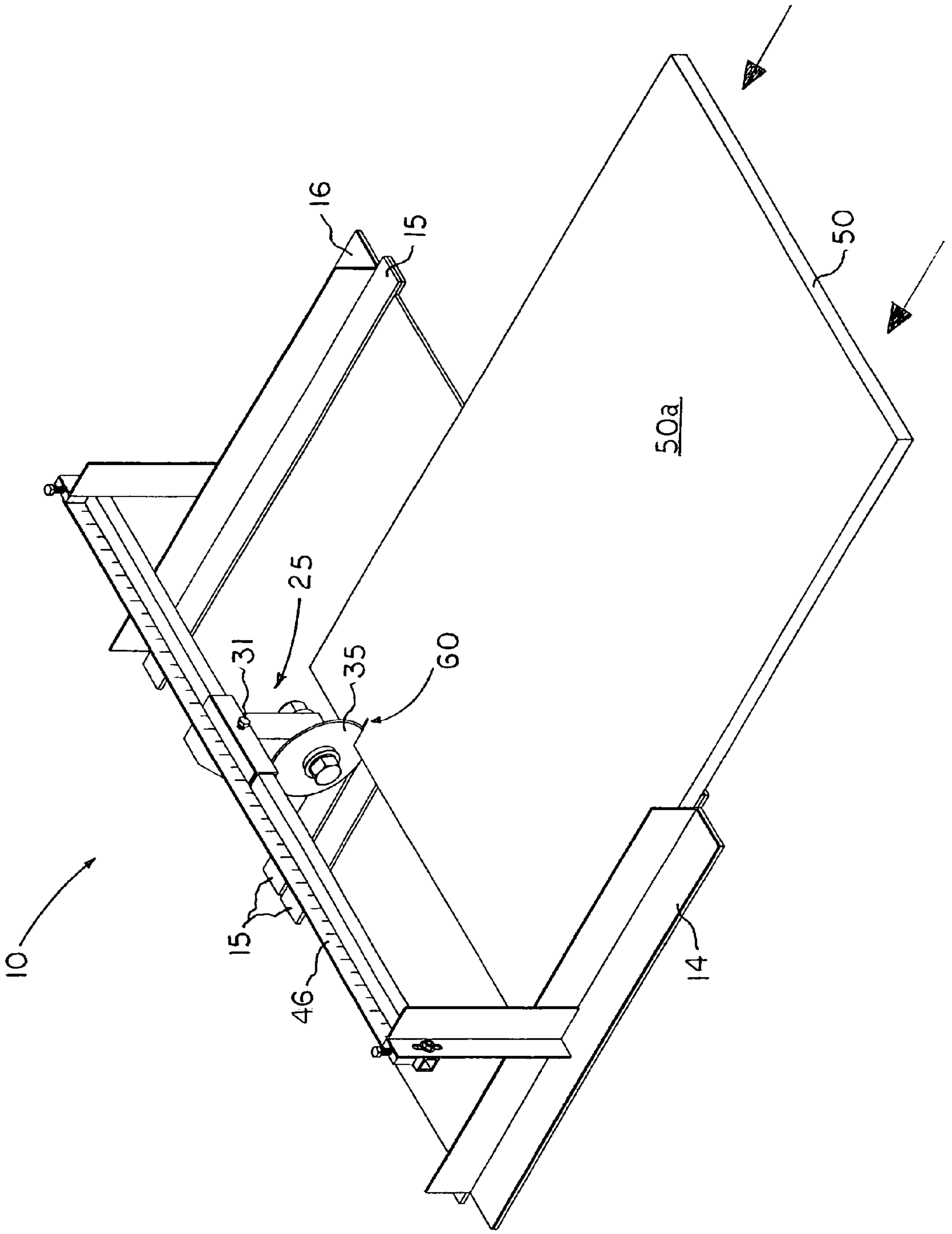
FIG. 5 is a front perspective view of the present cutting system showing a rigid foam panel being cut therein.

The present cutting system includes a base plate or table 12 whereon a pair of horizontally opposed angle brackets or fences 14, 16 are attached such that vertical members 14*a*, 16*a* of each fence 14, 16 are disposed in perpendicular relation to table 12 and such that each vertical member 14*a*, 16*a* is parallel to the other. Fences 14, 16 are also disposed in parallel relation to blade 35 and function to guide a lateral edge of foam panel 50 (FIG. 5) to produce a straight cut during operation as explained hereinafter in further detail.

In an alternative construction of the present invention (not illustrated), the cutting system 10 is fabricated with a single fence 14 and still retains its essential function. For example, fence 16 can be omitted from the present cutting system to reduce manufacturing costs and vertical post 20 attached directly to table 12 by weldment or other fasteners.

In the embodiment shown in FIG. 1, table 12 and fences 14, 16 are constructed from aluminum sheet and aluminum right angle stock respectively and secured by weldment or fasteners in the positions shown. Other materials such as laminated wood or engineered plastics are suitable for the fabrication of table 12 and fences 14, 16.

A plurality of elongated panel glide members 15 are provided for installation on table 12 extending from front to back across the table 12 as shown in FIG. 1. Glides 15 function to support a rigid foam panel 50 (FIG. 5) or a portion thereof slightly above an upper surface of table 12 providing clearance for blade 35 during the cutting operation. It can be seen that a pair of such glides 15 are disposed on either side of blade 35 and another pair of glides 15 are positioned adjacent to each fence 14, 16 in the standard setup of the present cutting system 10. In the embodiment shown guides 15 are constructed of wood and configured for sliding attachment to the front and rear edges 12*b*, 12*c* of table 12. Of course, other suitable materials such as laminated wood or engineered plastics may be utilized to fabricate glides 15.

Figure 2A:
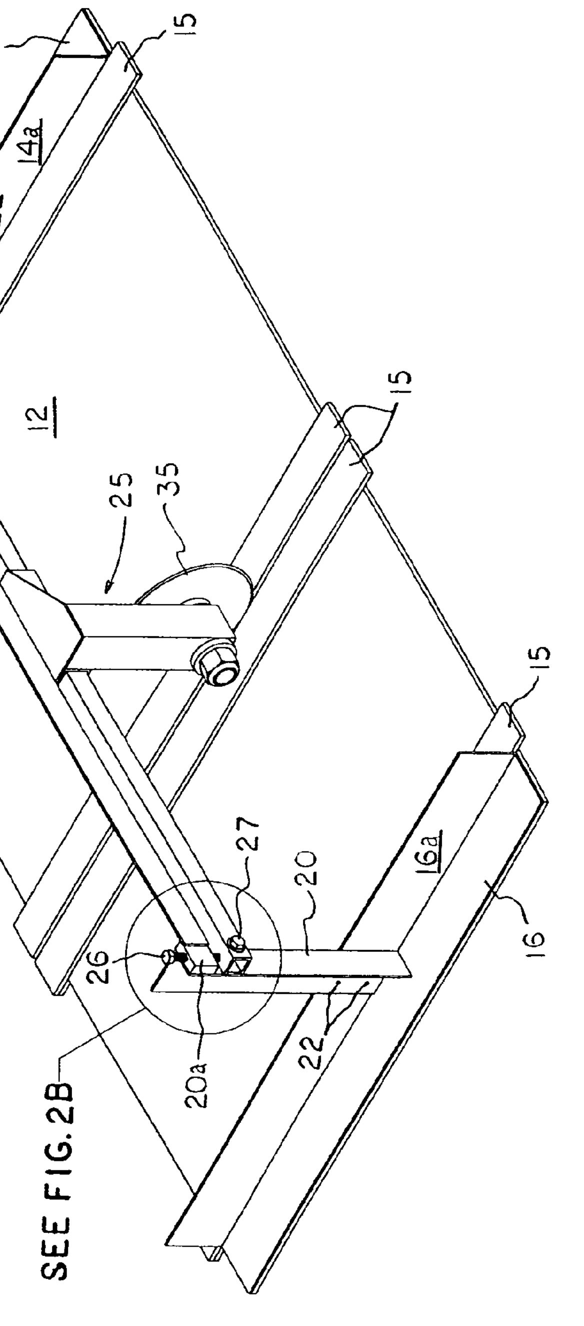
FIG. 2A is a rear perspective view of the present rigid foam insulation cutting system.
Figure 2B:
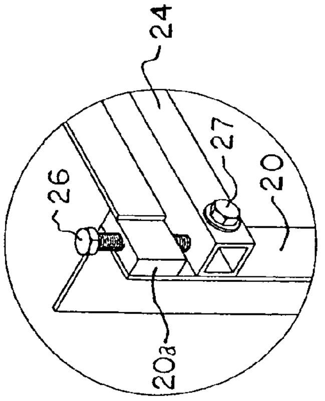
FIG. 2B is an enlarged perspective view of a portion of FIG. 2A showing further details thereof.

Referring now to the embodiment shown in FIG. 2A, a pair of vertically disposed posts 18, 20 are secured to fences 14, 16 respectively being attached thereto by fasteners 22 in perpendicular relation to table 12 as shown. Posts 18, 20 both include a lug member 18*a*, 20*a* respectively attached thereto by weldment as more clearly shown in FIG. 2B. Each lug member 18*a*, 20*a* includes an internally threaded hole (not shown) formed therein to receive mating machine bolts 26. Each post 18, 20 also includes a vertically disposed slot 18*b*, 20*b* respectively formed therein (FIG. 3) and located directly below lug members 18*a*, 20*a*. In the embodiment shown posts 18, 20 are fabricated from right angle stock of a suitable material such as steel.

Figure 3:
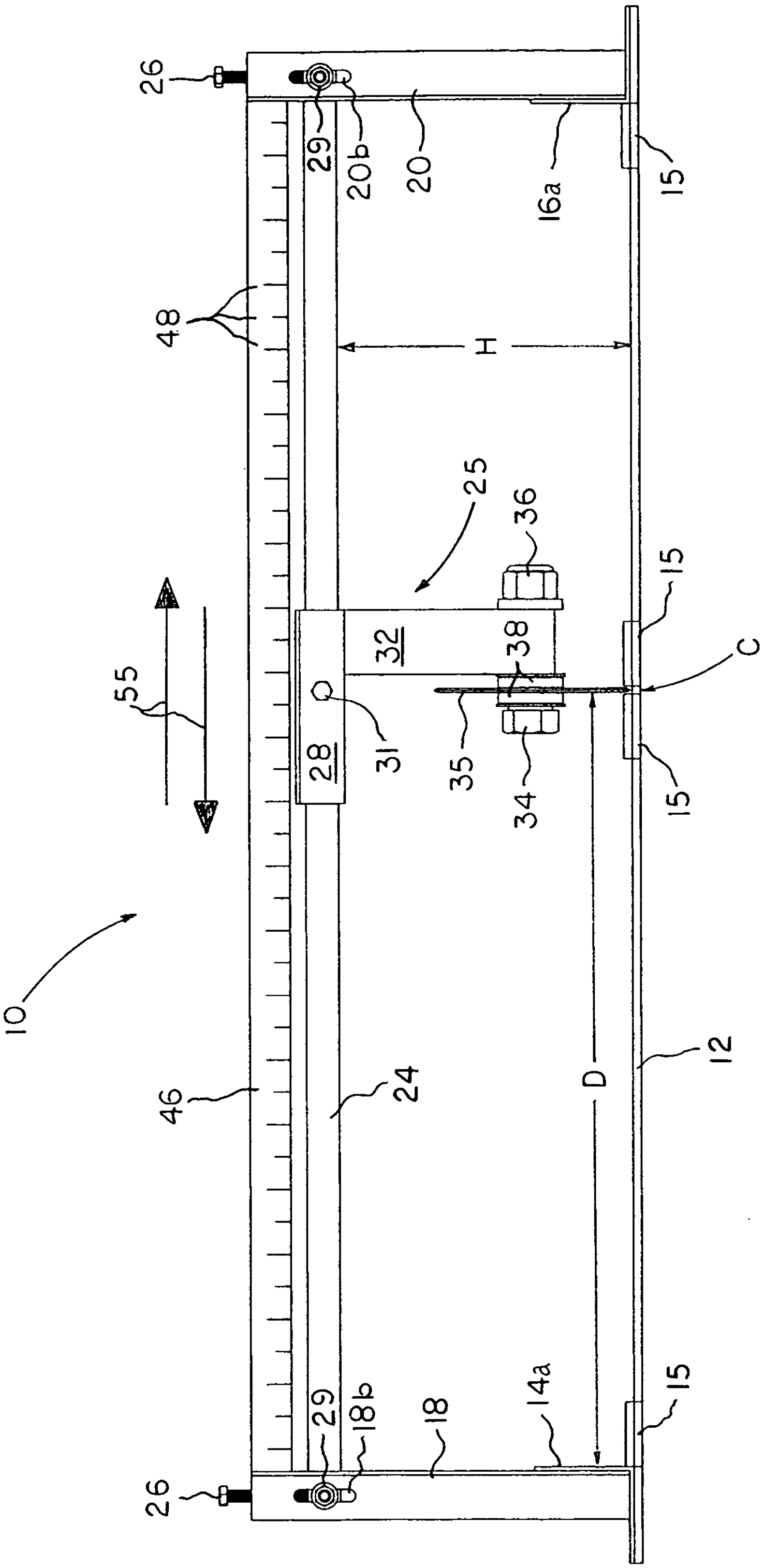
FIG. 3 is a front elevation view of the present cutting system showing details of the carriage assembly.

Referring to FIG. 3, an elongated crossbar 24 extends across table 12 in generally parallel relation thereto and is mechanically attached at each end thereof to posts 18, 20 by machine bolts 27 (FIG. 2A) extending through slots 18*b*, 20*b* and engaging mating nuts 29 (FIG. 3) at a position proximate to machine bolts 26 as shown. Machine bolts 26 are advanced into threads within each lug member 18*a*, 20*a* and into contact with crossbar 24 to function as stops thereby preventing any upward movement of the crossbar in operation. In the embodiment shown crossbar 24 is fabricated from square, tubular material such as steel. Crossbar 24 can be fabricated from other suitable material such as solid cylindrical stock or tubular cylindrical tubular stock.

The present invention provides means for measuring a rigid foam panel 50 being cut with the cutting system 10 including, but not limited to, the following measuring means. In one embodiment of the present invention, a measuring scale 46 having graduated indicia 48 inscribed thereon extends across table 12 in proximity to crossbar 24 as shown in FIG. 3. Scale 46 is positioned at a location proximate to crossbar 24 as shown being attached to lug members 18*a*, 20*a* (FIG. 2A) to be conveniently viewed in the line-of-sight of the user.

It will be understood that scale 46 is installed at a predetermined position in vertical alignment with an inner surface of fence 14 corresponding to a zero point on scale 46 for measurement purposes. Any conventional measuring scale 46 graduated in English or metric indicia 48 is sufficient for this purpose.

It will be appreciated by those skilled in the art that various other measuring means including both metric and/or inch measurements may be adapted for use with the present invention. For example, other measuring means (not illustrated) such as those common to calipers utilizing a Vernier scale, a measuring means of the type having a small gear rack that drives a pointer on a circular dial or a measuring means having an electronic digital readout on which a dimension is displayed are well known to those skilled in the art and such measuring means are considered to be within the scope of the present invention.

Referring again to FIG. 3, the present cutting system 10 includes an adjustable carriage assembly, indicated generally at 25, whereon a cutting blade 35 is mounted for traversal along crossbar 24. Carriage assembly 25 includes a truck member 28 which is fabricated from a length of square, tubular stock having an inside dimension which is sufficiently larger than the outside dimension of crossbar 24 to provide a sliding fit with the crossbar. Of course, truck member 28 may be constructed of a cylindrical tubular material to provide a sliding fit with a crossbar 24 fabricated alternatively from solid or tubular, cylindrical stock as described hereinabove.

Still referring to FIG. 3 a blade support 32 extends downwardly in perpendicular relation to truck member 28 and is attached thereto by weldment in the embodiment shown. Blade support 32 includes a blade mounting bolt 34 and mating nut 36 which is fitted with blade adapter bushings 38 to permit blade 35 to be installed thereon and to rotate freely on bolt 34 in operation.

In an alternative construction (not illustrated), an optional, adjustable blade support 32 is configured to position blade 35 at any angle up to forty-five degrees (45°) relative to table 12 to produce angled cuts on a section of rigid foam panel 50 when desired.

Still referring to FIG. 3, carriage assembly 25 is adapted for sliding movement along crossbar 24 as indicated by directional arrows 55 for traversal between posts 18, 20 during use. Carriage assembly 25 includes a setscrew 31 to lock it in position during the cutting procedure. In this manner blade 35 may be positioned at a width dimension "D" in relation to fence 14 corresponding to the width dimension of a rigid foam panel 50 (FIG. 5) to be cut as explained hereinafter in further detail.

Figure 4A:
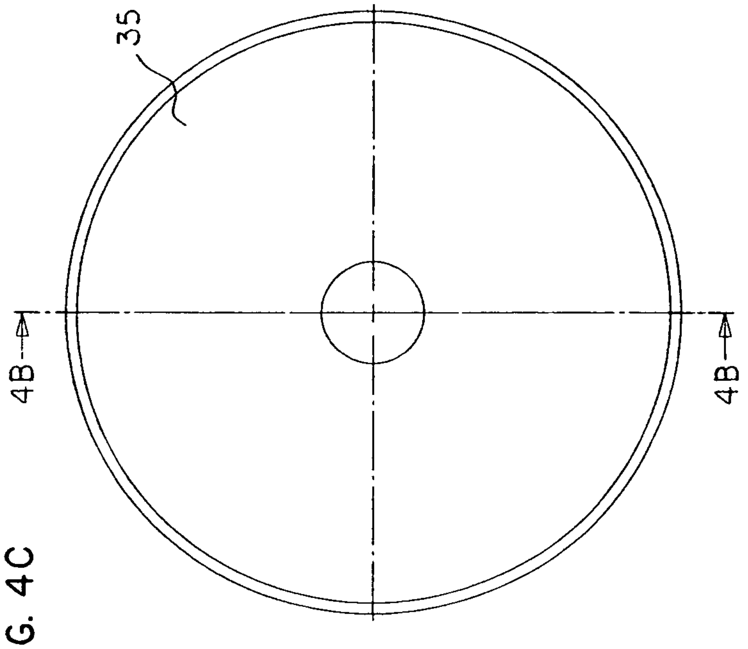
FIG. 4A is a side elevation view of a cutting blade of the present invention.
Figure 4B:
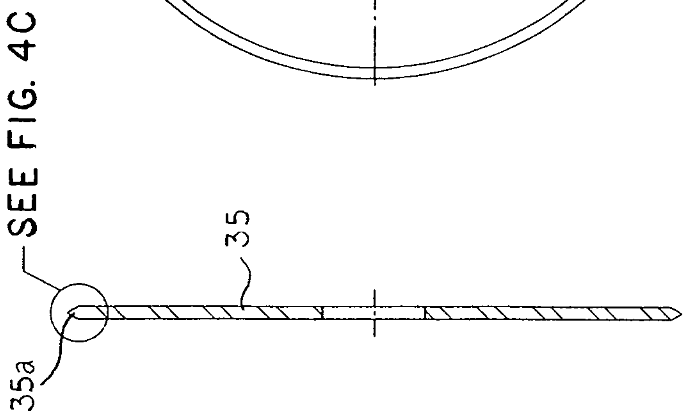
FIG. 4B is a cross-sectional view taken along section line 4B-4B of FIG. 4A showing further details of the cutting blade of FIG. 4A.
Figure 4C:
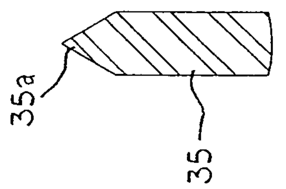
FIG. 4C is an enlarged, partial cross-sectional view of a portion of the cutting blade shown in FIG. 4B showing further details thereof.

In one embodiment blade 35 is symmetrically tapered in cross-section when viewed at its circumference along section line 4B-4B as most clearly shown in FIG. 4C. Blade 35 is manufactured from conventional hardened steel or other suitable material. It will be noted that in this configuration, blade 35 tends to maintain a sharp cutting edge as at 35*a* by repeated burnishing of blade 35 against the aluminum foil moisture barrier 50*a* of a rigid foam panel 50 during the cutting operation.

In a method of use of the present invention, the cutting system 10 is assembled as shown in FIG. 1 and mounted on a suitable stand, work bench or saw horses. Next, crossbar 24 is adjusted vertically within slots 18*b*, 20*b* to a height "H" (FIG. 3), which will allow adequate clearance between blade 35 and table 12 as at "C" and secured in position by tightening nuts 29 (FIG. 3). Thereafter, machine bolts 26 are advanced downwardly through lugs 18*a*, 20*a* into contact with crossbar 24 to stop position any upward deflection of the crossbar during use.

Next, carriage assembly 25 is traversed along crossbar 24 to a position corresponding to a dimension "D" of a foam panel 50 to be cut (FIG. 3). Blade 35 is visually aligned by the user with scale 46 to fine adjust carriage assembly 25 and the blade to the desired position. Thereafter, setscrew 31 is tightened to hold the carriage assembly 25 in the selected position on crossbar 24. Next, glides 15 are arranged on either side of blade 35 and also adjacent to both fences 14, 16.

Thereafter, a rigid foam panel 50 to be cut is positioned on glides 15 and held against an inner surface of vertical member 14*a* of fence 14 to ensure a straight cut or kerf as at 60 parallel to the lateral edge of the foam panel. Next, foam panel 50 is manually advanced by the user into contact with blade 35 with sufficient pressure to pass between the inner surface of vertical member 14*a* and blade 35 cutting the panel to the selected dimension "D". Advantageously, blade 35 passes through foam panel 50 providing a smooth, finished edge without tearing the foil moisture barrier 50*a*, which is adhered to the panel. Repeated cutting passes through the foil moisture barrier 50*a* has been observed to maintain the desired sharpness of blade 35 by burnishing the blade. This prevents tearing of the metallic foil moisture barrier 50*a* that is caused by the conventional practice of powered cutting of foam panels 50 with a circular saw or by the use of a utility knife.

The procedure described hereinabove to cut foam panels 50 is typically repeated using the cutting system 10 to produce multiple, rigid foam boards of the same dimension "D" or, alternatively, carriage assembly 25 is reset utilizing scale 46 to position blade 35 at a different width dimension to produce foam boards of another size.

Thus, the present invention provides a cutting system 10 and related method of use for manually cutting rigid foam insulation panels 50. The present cutting system 10 requires no electric power, which completely eliminates airborne foam particulates produced by powered cutting and is completely portable, which permits the use of the present system at any construction site. The present cutting system 10 is fully adjustable to accommodate full sheets of rigid foam insulation of different thicknesses.

Although not specifically illustrated in the drawings, it should be understood that additional equipment and structural components will be provided as necessary and that all of the components described above are arranged and supported in an appropriate fashion to form a complete and operative rigid foam insulation cutting system incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of my invention, what I desire to secure by U.S. Letters Patent is:

1. A rigid foam insulation panel cutting system comprising:

a base plate, wherein said base plate includes a front edge, a back edge and opposed lateral edges;

a pair of vertical fences disposed in perpendicular relation to said base plate and in parallel to each other;

a pair of vertical posts attached to said fences, wherein said posts are disposed in perpendicular relation to said base plate;

a crossbar extending between said posts in spaced-apart relation to said base plate;

a plurality of movable glide members extending from said front edge to said back edge of said base plate, said glide members being imparted with sliding movement between said fences, wherein said glide members support a rigid foam insulation panel to provide clearance with said base plate during a cutting operation; and a manually-operated carriage assembly including an unpowered cutting blade mounted thereon, wherein said carriage assembly is adapted for sliding movement along said crossbar enabling said cutting blade to be disposed at a position corresponding to a dimension of a rigid foam insulation panel to be cut, wherein said carriage assembly includes a truck member fabricated from tubular material having an inside dimension sufficiently larger than an outside dimension of said crossbar to provide a sliding fit with said crossbar enabling said carriage assembly to be traversed along said crossbar between said posts, wherein said rigid foam insulation panel is cut by manually advancing said panel into contact with said blade with sufficient pressure to cut said panel without using electrical power.

2. A rigid foam insulation panel cutting system of claim 1 wherein said crossbar and said truck member are fabricated from tubular material being square in cross-section.

3. A rigid foam insulation panel cutting system of claim 1 including a measuring means indexed at a zero point aligned with at least one of said fences.

4. A rigid foam insulation panel cutting system of claim 3 wherein said measuring means includes a measuring scale having graduated indicia inscribed thereon.

5. A rigid foam insulation panel cutting system of claim 1 wherein said cutting blade is rotatably mounted on said carriage assembly in parallel relation to said fences.

* * * * *